Apr. 17, 1923.
G. P. ALLEN
1,452,017
SPRING SUSPENSION FOR MOTOR VEHICLES, ETC
Filed March 4, 1920
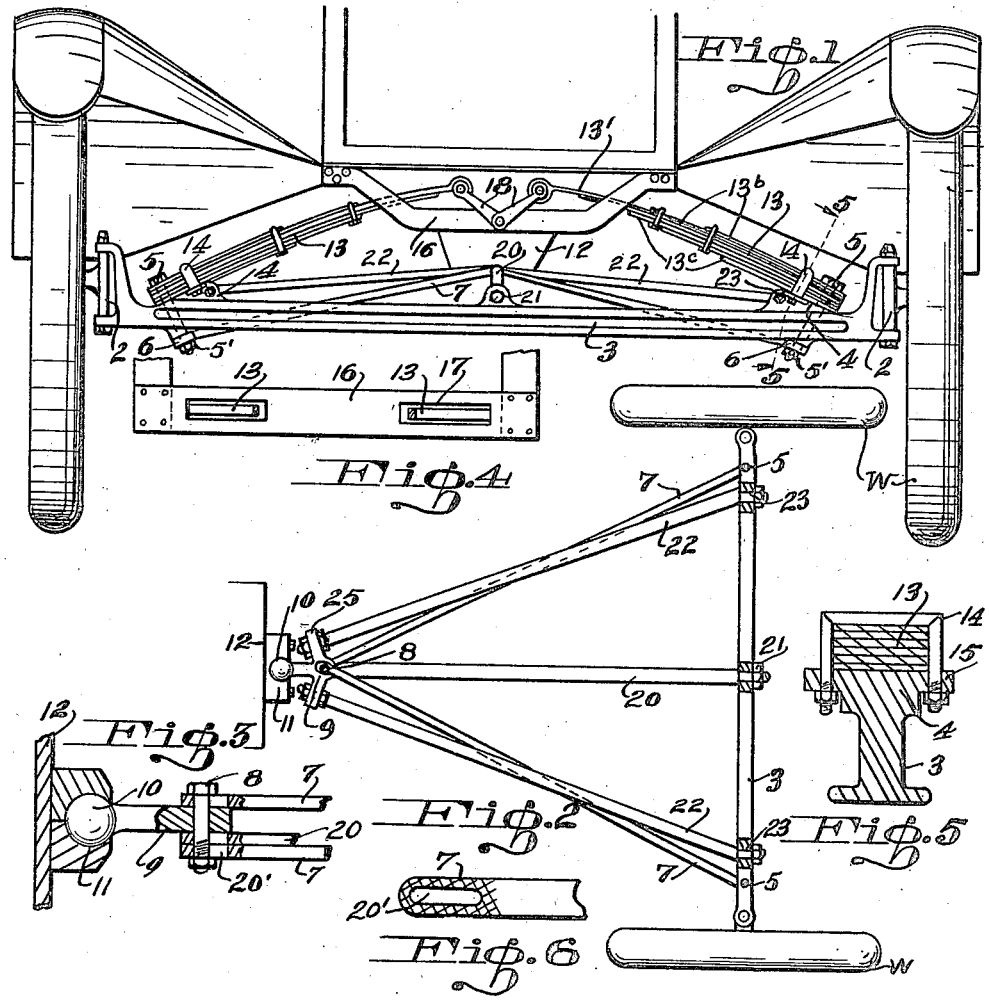
INVENTOR
G. P. Allen
BY Hazard & Miller
ATT'YS Patented Apr. 17, 1923.

1,452,017

UNITED STATES PATENT OFFICE.

GEORGE P. ALLEN, OF LOS ANGELES, CALIFORNIA.

SPRING SUSPENSION FOR MOTOR VEHICLES, ETC.

Application filed March 4, 1920. Serial No. 363,191.

*To all whom it may concern:*

Be it known that I, GEORGE PHILLIP ALLEN, a citizen of the United States, residing at Los Angeles, in the county of Los Angeles and State of California, have invented new and useful Improvements in Spring Suspensions for Motor Vehicles, Etc., of which the following is a specification.

This invention relates to spring suspension means for vehicles and particularly for automobiles, and has for its object to provide an improved resilient connection between the body of the vehicle and the running gear, and the invention consists of the construction, the combination, details and arrangements of the parts, an embodiment of which invention is illustrated in the accompanying drawings and described and claimed herein.

Figure 1 is a front elevation of a typical form of running gear for an automobile in which the improvements are combined.

Fig. 2 is a plan view of a part of the running gear, parts being broken away and in section to secure clarity.

Fig. 3 is a sectional detail view of the connection between the truss rods and the universally jointed hanger.

Fig. 4 is a plan view of the cross beam at the fore end of a body frame.

Fig. 5 is a detail sectional view on line 5—5 of Fig. 1.

Fig. 6 is a plan view of the rear end of one of the auxiliary brace members showing the elongated bolt hole and roughened face.

In the embodiment of the invention shown in Figs. 1 to 5, the wheels W are pivotally connected by knuckle joints 2 to an axle 3 the outer end portions of which are provided with upwardly inclined spring seat portions 4 that are each provided with through holes 5. Through these holes there extend obliquely arranged fastening bolts 5' the lower ends of which pass through eyes 6 in the adjacent ends of brace or truss rods 7—7 that converge from the front axle ends rearwardly to, and are mounted upon, a vertical bolt 8 passing through the swivel tie 9, the rear end of which is provided with a ball 10 playing in a socket 11 provided therefor in a suitable bracket portion 12 of the frame; so that these brace rods 7—7 support the axle 3 against oscillation about the vertical axis between their ends and also tend to prevent the relative rolling or tilting of the axle on its own axis.

Resting on the spring seats 4—4 are the outer ends of respective spring piles 13—13 these ends being perforated to receive the fastening bolts 5'—5' which clamp the butt end of the springs against the seats in co-operation with other clamping and holding means comprising U-clips 14 straddling the butts of the spring piles 13 and having their shanks extend through flange portions 15 provided therefor at the sides of the spring seats 4 which, in this case, are shown as integrally formed with the axle 3. The U-clips 14 serve not only to hold the springs 13 to the seats but also prevent the swinging of the springs about the bolts 5.

The upper and swinging ends of the springs 13 are passed through the transverse or cross frame element 16 that may be of channel iron of any other suitable structure and is provided with longitudinal apertures 17 through which the spring ends extend, as shown in Fig. 4. The spring ends overhang the top of the cross beam 16 and are connected thereto by shackle links 18 permitting change of position due to deflection of the spring ends with respect to the cross beam 16.

In addition to the auxiliary braces 7 for supporting the axle 3 main diagonal braces 22 extend from the seats 4 at 23 and converge toward and are adjustable in laterally extending ears or lugs 25 that are provided on the tie or hitching part 9, as shown in Fig. 2; these rods serve to line up the axle. A medially extending brace 20 is attached at 21 to the central portion of the axle and has its rear end attached to the bolt 8. The rear ends of the auxiliary braces 7 and 20 are slotted as at 20' in Fig. 6 and the flat surfaces are roughened to secure rigid frictional interlock of the parts.

Various changes may be made without departing from the spirit of the invention as claimed.

What is claimed is:

1. A spring suspension for automobile bodies, comprising, in combination with an axle, laminated spring piles secured at butt ends of each to the axle ends and converging above the axle, and divergent shackles attached to the proximate ends of the springs and pivotally connected to the body frame on a common pivot.

2. The combination, in a vehicle, of a body frame having a front cross car with upwardly and outwardly bent end portions which are apertured from top to bottom, an axle, and laminated spring piles secured at their remote butt ends to the axle and converging inwardly and upwardly therefrom, and shackles connecting the proximate ends of the springs to said bar, the yielding ends of the spring piles passing through the apertures in the bar.

3. A spring suspension device for automobiles comprising, in combination with the frame and the axle, a pair of spring arms having their butt ends secured adjacent the ends of the axle and held against rotative tendency thereon; the arms having their swinging ends arranged in juxtaposition and movably connected to a transverse member of the vehicle frame, the said member being longitudinally apertured for the passage and play of the spring ends.

In testimony whereof I have signed my name to this specification.

GEORGE P. ALLEN.